(12) United States Patent
Shi et al.

(10) Patent No.: US 9,986,359 B1
(45) Date of Patent: May 29, 2018

(54) SYSTEM AND METHOD FOR LOUDSPEAKER POSITION ESTIMATION

(71) Applicant: DTS, Inc., Calabasas, CA (US)

(72) Inventors: Guangji Shi, San Jose, CA (US);
Michael M. Goodwin, Scotts Valley, CA (US); Edward Stein, Aptos, CA (US)

(73) Assignee: DTS, Inc., Calabasas, CA (US)

( * ) Notice: Subject to any disclaimer, the term of this patent is extended or adjusted under 35 U.S.C. 154(b) by 0 days. days.

(21) Appl. No.: 15/366,818

(22) Filed: Dec. 1, 2016

Related U.S. Application Data

(60) Provisional application No. 62/423,041, filed on Nov. 16, 2016.

(51) Int. Cl.
*H04S 7/00* (2006.01)
*H04R 29/00* (2006.01)

(52) U.S. Cl.
CPC ........... *H04S 7/301* (2013.01); *H04R 29/001* (2013.01); *H04S 7/40* (2013.01); *H04S 2400/01* (2013.01)

(58) Field of Classification Search
CPC ............... H04S 7/00; H04R 2205/024; H04R 2201/028; H04R 2430/00; H04R 2430/23; H04R 25/305; H04R 9/06
See application file for complete search history.

(56) References Cited

U.S. PATENT DOCUMENTS

| | | | |
|---|---|---|---|
| 6,826,284 B1 | 11/2004 | Benesty et al. | |
| 2001/0038702 A1* | 11/2001 | Lavoie | H04S 7/301 381/307 |
| 2009/0238370 A1* | 9/2009 | Rumsey | H04R 29/00 381/58 |
| 2009/0238371 A1* | 9/2009 | Rumsey | H04R 29/001 381/58 |

(Continued)

OTHER PUBLICATIONS

International Search Report and Written Opinion for International Application No. PCT/US2017/061033, Notification dated Jan. 24, 2018.
International Search Report and Written Opinion for International Application No. PCT/US2017/061034, Notification dated Jan. 24, 2018.

*Primary Examiner* — Mohammad Islam
(74) *Attorney, Agent, or Firm* — Knobbe Martens Olson & Bear LLP

(57) ABSTRACT

Embodiments of systems and methods are described for estimating a position of a loudspeaker and notifying a listener if an abnormal condition is detected, such as an incorrect loudspeaker orientation or an obstruction in a path between the loudspeaker and a microphone array. For example, a front component of a multi-channel surround sound system may include the microphone array and a position estimation engine. The position estimation engine may estimate the distance between the loudspeaker and the microphone array. In addition, the position estimation engine may estimate an angle of the loudspeaker using a first technique. The position estimation engine may also estimate an angle of the loudspeaker using a second technique. The (Continued)

two angles can be processed to determine whether the abnormal condition exists. If the abnormal condition exists, a listener can be notified and be provided with suggestions for resolving the issue in a graphical user interface.

21 Claims, 12 Drawing Sheets

(56) References Cited

U.S. PATENT DOCUMENTS

| | | | |
|---|---|---|---|
| 2010/0272270 A1* | 10/2010 | Chaikin | H04R 29/008 381/59 |
| 2011/0091055 A1 | 4/2011 | LeBlanc | |
| 2012/0117502 A1 | 5/2012 | Nguyen et al. | |
| 2012/0288124 A1* | 11/2012 | Fejzo | H04R 5/02 381/303 |
| 2013/0058492 A1* | 3/2013 | Silzle | H04R 5/027 381/59 |
| 2013/0223658 A1* | 8/2013 | Betlehem | H04S 3/002 381/307 |
| 2015/0016642 A1* | 1/2015 | Walsh | H04S 7/301 381/307 |
| 2015/0271616 A1* | 9/2015 | Kechichian | H04R 3/02 381/58 |
| 2016/0309277 A1 | 10/2016 | Hiscock | |

* cited by examiner

SYSTEM AND METHOD FOR LOUDSPEAKER POSITION ESTIMATION

CROSS-REFERENCE TO RELATED APPLICATIONS

This application claims priority under 35 U.S.C. § 119(e) to U.S. Provisional Application No. 62/423,041, entitled "SYSTEM AND METHOD FOR LOUDSPEAKER POSITION ESTIMATION" and filed on Nov. 16, 2016, which is hereby incorporated by reference in its entirety.

BACKGROUND

Surround sound systems generally require calibration by listeners to achieve a high-quality listening experience. Typically, surround sound systems are manually calibrated using a multi-element microphone placed at a sweet spot or default listening position to receive test signals played by each loudspeaker of the surround sound system. The multi-element microphone is usually tethered to an audio/visual (A/V) receiver or processor via a long cable. However, physically placing the multi-element microphone at the sweet spot or default listening positioning can be cumbersome for listeners.

SUMMARY

One aspect of the disclosure provides an apparatus for estimating a position of a loudspeaker in a multichannel surround sound system. The apparatus comprises a microphone array comprising a first microphone and a second microphone, wherein the first microphone is configured to generate a first audio signal in response to the loudspeaker outputting a test signal, and wherein the second microphone is configured to generate a second audio signal in response to the loudspeaker outputting the test signal. The apparatus further comprises a position estimation engine coupled to the microphone array, the position estimation engine configured to: determine a time difference of arrival estimate based on the first audio signal and the second audio signal; determine a first angle based on the time difference of arrival estimate; identify a first direct path component in an impulse response derived from the first audio signal; identify a second direct path component in an impulse response derived from the second audio signal; determine a second angle based on the first direct path component and the second direct path component; and determine whether an abnormal condition exists based on a comparison of the first angle and the second angle.

The apparatus of the preceding paragraph can include any sub-combination of the following features: where the position estimation engine is further configured to: partition the first audio signal into one or more first segments, partition the second audio signal into one or more second segments, generate a Fourier transform of a first segment in the one or more first segments to form a first Fourier transform, generate a Fourier transform of a first segment in the one or more second segments to form a second Fourier transform, and determine the time difference of arrival estimate based on the first Fourier transform and the second Fourier transform; where the position estimation engine is further configured to: determine a plurality of time difference of arrival estimates based on generated Fourier transforms of the one or more first segments and the one or more second segments, aggregate the plurality of time difference of arrival estimates into a histogram, and determine the time difference of arrival estimate based on a time difference of arrival estimate in the plurality of time difference of arrival estimates that has the most occurrences in the histogram; where the position estimation engine is further configured to identify the first direct path component in the impulse response derived from the first audio signal based on a highest amplitude in the impulse response derived from the first audio signal; where the position estimation engine is further configured to: select a first time window that includes the first direct path component, select a second time window that includes the second direct path component, determine a cross correlation using data in the first time window and data in the second time window, and determine the second angle using the determined cross correlation; where the position estimation engine is further configured to: compare the first angle with the second angle, and determine that the abnormal condition exists in response to a determination that the first angle and the second angle are not within a threshold angle value; where the threshold angle value comprises a value between zero and fifteen degrees; where the apparatus further comprises a notification generator configured to transmit a notification to a user device via a network in response to a determination that the abnormal condition exists; where the notification comprises one of an indication that an angle of the loudspeaker is incorrect, an indication that an object is obstructing a path between the loudspeaker and the microphone array, an indication that a polarity of the loudspeaker is incorrect, or an indication that a position of the loudspeaker is incorrect; where the apparatus comprises one of a soundbar, an audio/visual (A/V) receiver, a center speaker, or a television; and where the multichannel surround sound system is arranged in one of a stereo, a 2.1, a 3.1, a 5.1, a 5.2, a 7.1, a 7.2, an 11.1, an 11.2, or a 22.2 speaker layout.

Another aspect of the disclosure provides a method of estimating a position of a loudspeaker in a multichannel surround sound system. The method comprises receiving a first audio signal from a first microphone in a microphone array and a second audio signal from a second microphone in the microphone array; determining a time difference of arrival estimate based on the first audio signal and the second audio signal; determining a first angle based on the time difference of arrival estimate; identifying a first direct path component in an impulse response derived from the first audio signal; identifying a second direct path component in an impulse response derived from the second audio signal; determining a second angle based on the first direct path component and the second direct path component; and determining whether an abnormal condition exists based on a comparison of the first angle and the second angle.

The method of the preceding paragraph can include any sub-combination of the following features: where determining a time difference of arrival estimate further comprises: partitioning the first audio signal into one or more first segments, partitioning the second audio signal into one or more second segments, generating a Fourier transform of a first segment in the one or more first segments to form a first Fourier transform, generating a Fourier transform of a first segment in the one or more second segments to form a second Fourier transform, and determining the time difference of arrival estimate based on the first Fourier transform and the second Fourier transform; where identifying a first direct path component in an impulse response derived from the first audio signal further comprises identifying the first direct path component in the impulse response derived from the first audio signal based on a highest amplitude in the impulse response derived from the first audio signal; where determining whether an abnormal condition exists further comprises: comparing the first angle with the second angle, and determining that the abnormal condition exists in response to a determination that the first angle and the second angle are not within a threshold angle value; where the threshold angle value comprises a value between zero and fifteen degrees; and where the method further comprises transmitting a notification to a user device via a network in response to a determination that the abnormal condition exists, wherein the notification comprises one of an indication that an angle of the loudspeaker is incorrect, an indication that an object is obstructing a path between the loudspeaker and the microphone array, an indication that a polarity of the loudspeaker is incorrect, or an indication that a position of the loudspeaker is incorrect.

Another aspect of the disclosure provides a non-transitory physical computer storage comprising executable instructions stored thereon that, when executed by a hardware processor, are configured to at least: instruct a loudspeaker to transmit a test signal; determine a first angle based on a first audio signal recorded from a first microphone in a microphone array and a second audio signal recorded from a second microphone in the microphone array using a first technique; determine a second angle based on the first audio signal and the second audio signal using a second technique; and determine whether an abnormal condition exists based on a comparison of the first angle and the second angle.

The non-transitory physical computer storage of the preceding paragraph can include any sub-combination of the following features: where the first technique comprises a Generalized Cross Correlation And Phase Transform (GCC-PHAT) technique; and where the second technique comprises a direct path component (DPC) technique.

For purposes of summarizing the disclosure, certain aspects, advantages and novel features of the inventions have been described herein. It is to be understood that not necessarily all such advantages can be achieved in accordance with any particular embodiment of the inventions disclosed herein. Thus, the inventions disclosed herein can be embodied or carried out in a manner that achieves or optimizes one advantage or group of advantages as taught herein without necessarily achieving other advantages as can be taught or suggested herein.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

DETAILED DESCRIPTION

Introduction

Figure 1A:
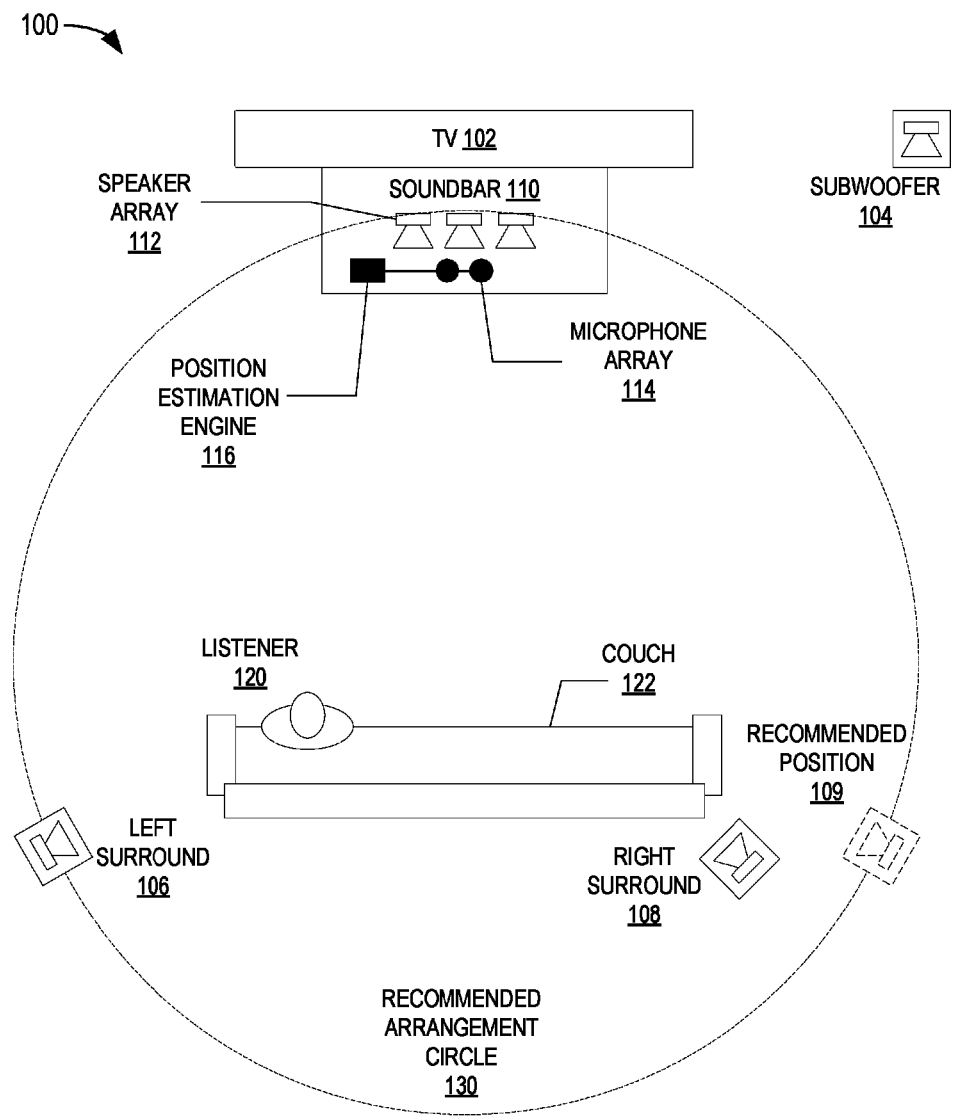
FIG. 1A illustrates a high-level block diagram depicting an example room environment for estimating loudspeaker positions and calibrating a multichannel surround sound system, according to one embodiment.

As described above in the background, requiring a listener to physically place a multi-element microphone at a sweet spot or default listening positioning for the purpose of calibration can be cumbersome. Accordingly, one or more microphones can be integrated into a central, known location. For example, one or more microphones can be integrated into a front component of a multichannel surround sound system, such as a soundbar, an A/V receiver, a center speaker, a television, in a device under or above a television, and/or the like.

Standard layouts can indicate the location(s) to place one or more loudspeakers, relative to the central, known location of the one or more microphones or another reference point (e.g., a listening position), to achieve an optimal or near optimal listening experience. However, it is often difficult for listeners to place loudspeakers in the optimal locations. For example, a wall, a door, furniture, and/or other objects may prevent the listener from placing one or more loudspeakers in the optimal locations. If the loudspeakers cannot be placed in the optimal locations, distortion of the audio image may result and the listener may not experience the sound scene that the content creators intended.

When a loudspeaker cannot be placed in the optimal location, audio signals sent to the loudspeaker can be modified to minimize the distortion via spatial calibration and compensation. For spatial calibration, it may be important to determine the location of the loudspeaker relative to the central, known location of the one or more microphones or relative to the listening position.

Typically, the location of a loudspeaker is estimated by playing a calibration signal over the loudspeaker, receiving the resulting acoustic signal with the calibration microphone(s), recording the microphone output signal(s), and analyzing the recorded signal(s) with a technique such as the Generalized Cross Correlation with Phase Transform weighting (GCC-PHAT). The GCC-PHAT technique can produce reliable results when the loudspeaker is directly facing the one or more microphones. However, the GCC-PHAT technique can produce unreliable results under other circumstances. For example, the GCC-PHAT technique can produce unreliable results if an object obstructs a path between the loudspeaker and the one or more microphones. As another example, the GCC-PHAT technique can produce unreliable results if the loudspeaker is oriented in a direction other than a direction facing the one or more microphones.

Accordingly, embodiments of a loudspeaker position estimation system are described herein that estimates a position and/or orientation of a loudspeaker and that notifies a listener if the loudspeaker orientation is incorrect or if an object is obstructing a path between the loudspeaker and a microphone. For example, the loudspeaker position estimation system can be integrated within a device (e.g., an A/V receiver, a soundbar, a central speaker, a television, etc.) that includes two or more microphones. The loudspeaker position estimation system can instruct a loudspeaker to output a test signal (e.g., a maximum length sequence). Each of the microphones can receive an acoustic signal generated as a result of the outputted test signal. Each of the microphones can transduce the acoustic signal into an audio signal, where the audio signal can be recorded on a storage device. The loudspeaker position estimation system can determine a distance of the loudspeaker. Furthermore, the loudspeaker position estimation system can determine an estimated angle of the loudspeaker using the GCC-PHAT technique and the recorded audio signals. The loudspeaker position estimation system can also determine an estimated angle of the loudspeaker using the direct path components (DPCs) obtained from the recorded audio signals.

The loudspeaker position estimation system can compare the two estimated angles. If the two estimated angles are within a threshold angle value, then the loudspeaker position estimation system may notify the listener that no obstruction between the microphones and the loudspeaker is detected. The loudspeaker position estimation system may likewise notify the listener that the loudspeaker is oriented correctly toward the center of the listening circle. Optionally, the loudspeaker position estimation system can derive parameters for a compensation component based on at least one of the estimated angles if the two estimated angles are within the threshold angle value, where the parameters can be used to compensate for non-ideal loudspeaker placement or other abnormal conditions in the future (e.g., when processing audio prior to playback over the loudspeakers). However, if the two estimated angles are within the threshold angle value, an incorrect or non-ideal angle of the loudspeaker and/or an incorrect or non-ideal loudspeaker location may be present. The loudspeaker position estimation system may compare one or both estimated angles to an ideal angle (e.g., an angle specified in an ideal loudspeaker layout) and, if the compared angles are not within another threshold angle value, then the loudspeaker position estimation system may determine that an incorrect or non-ideal angle of the loudspeaker and/or an incorrect or non-ideal loudspeaker location is present. If the two estimated angles are not within the threshold angle value, then the loudspeaker position estimation system may notify the listener that an abnormal condition has been detected. Examples of an abnormal condition may include an obstruction between the microphones and the loudspeaker, an incorrect or non-ideal angle of the loudspeaker, an incorrect loudspeaker polarity, and/or an incorrect or non-ideal loudspeaker location. An application executing on a user device, such as a mobile computing device, may be in communication with the loudspeaker position estimation system and generate an interface that displays the notification. Alternatively or in addition, the loudspeaker position estimation system can provide information to the compensation component that modifies signals sent to the loudspeaker to compensate for non-ideal loudspeaker placement or other abnormal conditions. Additional details of the loudspeaker position estimation system are described below with respect to FIGS. 1A through 8.

Overview of Example Loudspeaker Position Estimation System

By way of overview, FIG. 1A illustrates a high-level block diagram depicting an example room environment 100 for estimating loudspeaker positions and calibrating a multichannel surround sound system, according to one embodiment. A multichannel surround sound system is often arranged in accordance with a standardized loudspeaker layout, such as stereo, 2.1, 3.1, 5.1, 5.2, 7.1, 7.2, 11.1, 11.2, or 22.2. Other loudspeaker layouts or arrays may also be used, such as wave field synthesis (WFS) arrays or other object-based rendering layouts. A soundbar is a special loudspeaker enclosure that can be mounted above or below a display device, such as a monitor or a television. Recent soundbar models are often powered systems comprising speaker arrays integrating left and right channel speakers with optional center speaker and/or subwoofer as well. Soundbars have become a flexible solution for either a standalone surround sound system or a key front component in home theater systems when connected with wired or wireless surround speakers and/or subwoofers.

In FIG. 1A, the room environment 100 includes a 3.1 loudspeaker arrangement (e.g., a soundbar 110, a left surround loudspeaker 106, a right surround loudspeaker 108, and a subwoofer 104), a television 102 (or a monitor or a video screen), a listener 120 and a couch 122. The soundbar 110 can include a speaker array 112, a microphone array 114, a position estimation engine 116, a calibration engine (not shown), and an A/V processing engine (not shown) integrated in its enclosure. In other embodiments, the soundbar 110 includes different, fewer, or more components than those shown in FIG. 1A.

The advent and proliferation of DVD, Blu-Ray® and streaming content has led to the widespread availability of multichannel soundtracks. Most modern surround sound formats specify ideal loudspeaker placement to properly reproduce such content. Typical listeners that own surround sound systems often cannot comply with such specifications for loudspeaker setup due to practical reasons, such as room layout or furniture placement. This often results in a mismatch between the content producer's intent and the listener's spatial audio experience. For example, it is often recommended as a best practice to place loudspeakers along a recommended arrangement circle 130 and for the listener to sit at or near the center of the recommended arrangement circle 130. More details on recommended loudspeaker arrangements can be found in International Telecommunication Union (ITU) Report ITU-R BS.2159-4 (05/2012) "Multichannel Sound Technology in Home and Broadcasting Applications," which is incorporated by reference in its entirety. However, due to room constraints in the room environment 100 or user preferences, the right surround loudspeaker 108 is not placed at its recommended position 109, and the listener 120 is sitting on the couch 122 away from the center of the recommended arrangement circle 130.

One solution for such a problem, generally known as spatial calibration, typically requires a listener to place a microphone array at the default listening position (or sweet spot). The system then plays a test signal over each respective loudspeaker, records the corresponding microphone signals (e.g., transduced version of acoustic signals captured by the microphone array), and analyzes the recorded signals to approximate the location of each loudspeaker. By approximating the location of each loudspeaker 106 and 108, the system can then use a compensation process to spatially reformat a multichannel soundtrack to the actual speaker layout. To clarify, the spatial calibration process generally includes approximating the location of each loudspeaker, using the approximated locations to determine loudspeaker setup errors, suggesting remedies to the setup errors, and/or estimating compensation parameters that can be used by a compensation process (e.g., loudspeaker position estimates). The compensation process may include using the estimated compensation parameters to modify audio signals for optimal playback (e.g., when the loudspeakers are in a non-ideal system layout). However, this spatial calibration process can be intimidating or inconvenient for a typical listener. When the listener 120 moves to a different position, such existing methods have no way to detect and compensate for this change and the listener 120 has to go through the entire calibration process manually with the microphone placed at the new listening position. In contrast, using the integrated microphone array 114 in the soundbar 110, a calibration engine (not shown) in the soundbar 110 can perform spatial calibration for loudspeakers 106 and 108 as well as estimate the position of the listener 120 with minimal user intervention, as described in greater detail in U.S. Patent Publication No. 2015/0016642, titled "SPATIAL CALIBRATION OF SURROUND SOUND SYSTEMS INCLUDING LISTENER POSITION ESTIMATION" which is hereby incorporated by reference herein in its entirety. In some embodiments the listener position may be specified via a graphical user interface, as described in greater detail in U.S. patent application Ser. No. 15/357,971, filed on Nov. 21, 2016 and titled "GRAPHICAL USER INTERFACE FOR CALIBRATING A SURROUND SOUND SYSTEM," which is hereby incorporated by reference herein in its entirety. Another approach for spatial calibration is to incorporate a microphone in each loudspeaker 106 and 108, which can be prohibitively expensive compared to using a small microphone array integrated in a central component.

An accurate estimate of compensation parameters, however, may rely on accurate estimates of the positions of loudspeakers 106 and 108. Inaccurate loudspeaker 106 and 108 position estimates can lead to poor audio signal modification and/or a suboptimal listening experience. Conventional loudspeaker position estimation techniques can fail if, for example, a loudspeaker 106 or 108 is facing away from the microphone array 114 or a path between the microphone array 114 and a loudspeaker 106 or 108 is blocked by an object. For example, conventional loudspeaker position estimation techniques may inaccurately estimate a position of the left surround loudspeaker 106 because a front surface of the left surround speaker 106 is not oriented in a direction facing the microphone array 114. As another example, conventional loudspeaker position estimation techniques may inaccurately estimate a position of the right surround loudspeaker 108 even though a front surface of the right surround speaker 108 is oriented in a direction facing the microphone array 114 because the couch 122 lies in the path between the right surround loudspeaker 108 and the microphone array 114.

Thus, the position estimation engine 116 can implement techniques to improve loudspeaker 106 and 108 position estimation even if the loudspeaker 106 or 108 is not oriented in a direction of the microphone array 114 or if a path between the loudspeaker 106 or 108 and the microphone array 114 is blocked. For example, the position estimation engine 116 can estimate a position of a loudspeaker 106 or 108 using a first technique. The position estimated using the first technique may be considered a baseline estimate. The position estimation engine 116 can also estimate a position of the loudspeaker 106 or 108 using a second technique. The position estimated using the second technique may be leveraged to detect abnormal situations, like an obstructed path or an incorrect loudspeaker orientation. The position estimation engine 116 can use both position estimates to derive more reliable loudspeaker position estimates. The loudspeaker position estimates can be used to generate user notifications and/or to compensate for non-ideal loudspeaker 106 or 108 placement or other abnormal conditions. Additional details on the first and second techniques are described below with respect to FIGS. 2A-2D. While the position estimation engine 116 is described herein as using two position estimation techniques, this is not meant to be limiting. The position estimation engine 116 can combine the results of any number of position estimation techniques (e.g., 3, 4, 5, 6, etc.) to derive more reliable loudspeaker position estimates. Artificial intelligence, such as neural networks, or heuristic approaches can be used to combine the results of the position estimation techniques to derive the more reliable loudspeaker position estimates.

Figure 1B:
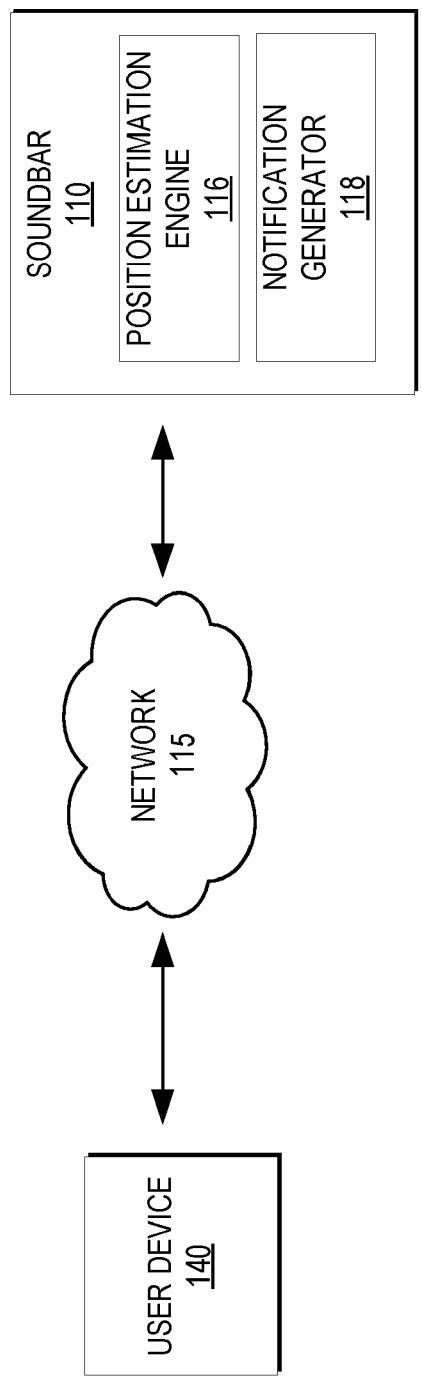
FIG. 1B illustrates a block diagram depicting a user device in communication with a soundbar via a network, according to one embodiment.

In addition, the soundbar 110 can generate a notification for the listener 120 when an abnormal situation is detected. FIG. 1B illustrates a block diagram depicting a user device 140 in communication with the soundbar 110 via a network 115, according to one embodiment. The network 115 can include a local area network (LAN), a wide area network (WAN), the Internet, or combinations of the same. As illustrated in FIG. 1B, the example soundbar 110 includes the position estimation engine 116 and a notification generator 118.

The user device 140 can be a desktop computer, laptop, tablet, personal digital assistant (PDA), television, wireless handheld device (such as a smartphone), soundbar, set-top box, A/V receiver, home theater system component, combinations of the same, and/or the like operated by the listener 120. The user device 140 can execute an application that causes the user device 140 to display a user interface. For example, the user interface can display estimated locations of the soundbar 110, the subwoofer 104, the left surround loudspeaker 106, and/or the right surround loudspeaker 108. The user interface can also include functionality to allow the listener 120 to begin a calibration (e.g., spatial calibration and/or non-spatial calibration). If the listener 120 initiates a calibration, the user device 140 can direct the soundbar 110 (e.g., a calibration engine embedded in the soundbar 110, not shown), via the network 115, to begin a calibration operation. As part of the calibration operation, the soundbar 110 instructs the position estimation engine 116 to estimate positions of one or more loudspeakers 106 and 108 in a manner as described herein. Based on the results of the position estimates, the position estimation engine 116 can determine whether an abnormal condition exists. Examples of an abnormal condition may include an object obstructing a path between the microphone array 114 and the loudspeaker 106 or 108, an incorrect loudspeaker 106 or 108 angle, an incorrect loudspeaker 106 or 108 polarity, and/or an incorrect or non-ideal loudspeaker 106 or 108 location. This determination can be sent by the position estimation engine 116 to the notification generator 118. In addition, the position estimates (or parameters derived from the position estimates) can be sent to a compensation component (e.g., a component that runs the compensation process described herein) in the soundbar 110 that modifies the multichannel audio for optimal playback over the loudspeakers 106 and 108 as placed, as described herein.

The notification generator 118 may generate a notification based on the determination provided by the position estimation engine 116. For example, if no abnormal condition is detected, then the notification generator 118 may generate a notification that no abnormal condition is detected or may not generate a notification at all. Alternatively, if an abnormal condition is detected, the notification generator 118 may generate a notification indicating which abnormal condition is detected, instruct the listener 120 how to fix the issue, and/or instruct the listener 120 to select the calibration option again once the issue is corrected. Optionally, the soundbar 110 can automatically fix the issue, as described in greater detail below.

The notification generator 118 can transmit the notification to the user device 140 via the network 115. Once a notification is received from the notification generator 118, the application may cause the user device 140 to display the notification in the user interface.

Note that FIGS. 1A-1B only illustrate one example of a surround sound system arrangement. Other embodiments may include different loudspeaker layouts with more or fewer loudspeakers. For example, the soundbar 110 can be replaced by a center channel speaker, two front channel speakers (one left and one right), and an A/V receiver to form a traditional 5.1 arrangement. In this example, the microphone array 114 may be integrated in the center channel speaker or in the A/V receiver, the calibration engine, the position estimation engine 116, and the notification generator 118 may be part of the A/V receiver, and the microphone array 114 may be coupled to the calibration engine, the position estimation engine 116, and/or the notification generator 118. The soundbar 110 can also be replaced with a television or any another A/V component, where the replacement A/V component includes the calibration engine, position estimation engine 116, the notification generator 118, and/or the microphone array 114.

While FIG. 1A illustrates the microphone array 114 as including two microphones, this is not meant to be limiting. Extra microphones or microphone arrays may be installed to face the top loudspeaker, left-side front loudspeakers, right-side front loudspeakers, and/or any other loudspeakers for better measurement and position estimation. For example, a third microphone can be included in the microphone array 114 at a different depth and/or a different height from the other two microphones (e.g., not in a straight line with the other two microphones). Positioning the third microphone outside of a line formed by the other two microphones may allow the position estimation engine 116 to estimate angles of loudspeakers in three dimensions (e.g., zenith angles in addition to azimuth angles).

Furthermore, while FIGS. 1A-1B illustrate a single position estimation engine 116 included in the soundbar 110, this is not meant to be limiting. The soundbar 110 may include any number of position estimation engines 116 (e.g., one position estimation engine 116 each for multiple different subsets of microphones in the microphone array 114). For example, the position estimation engine 116 can be a hardware device that includes a computer processing unit (CPU), memory, and/or other hardware components (e.g., analog to digital converters (ADC)). A bus may directly couple the CPU to a microphone in the microphone array 114 such that the CPU can process audio signals recorded from the microphone. If the soundbar 110 includes a single position estimation engine 116, a bus may couple each microphone in the microphone array 114 to a buffer that temporarily stores audio signals recorded from the respective microphone. A switching mechanism can be used to direct data from a buffer to the CPU for processing. Alternatively, the single position estimation engine 116 can include multiple CPUs and a bus may couple each microphone in the microphone array 114 to a separate CPU for processing.

Example Loudspeaker Position Estimation Process

Figure 2A:
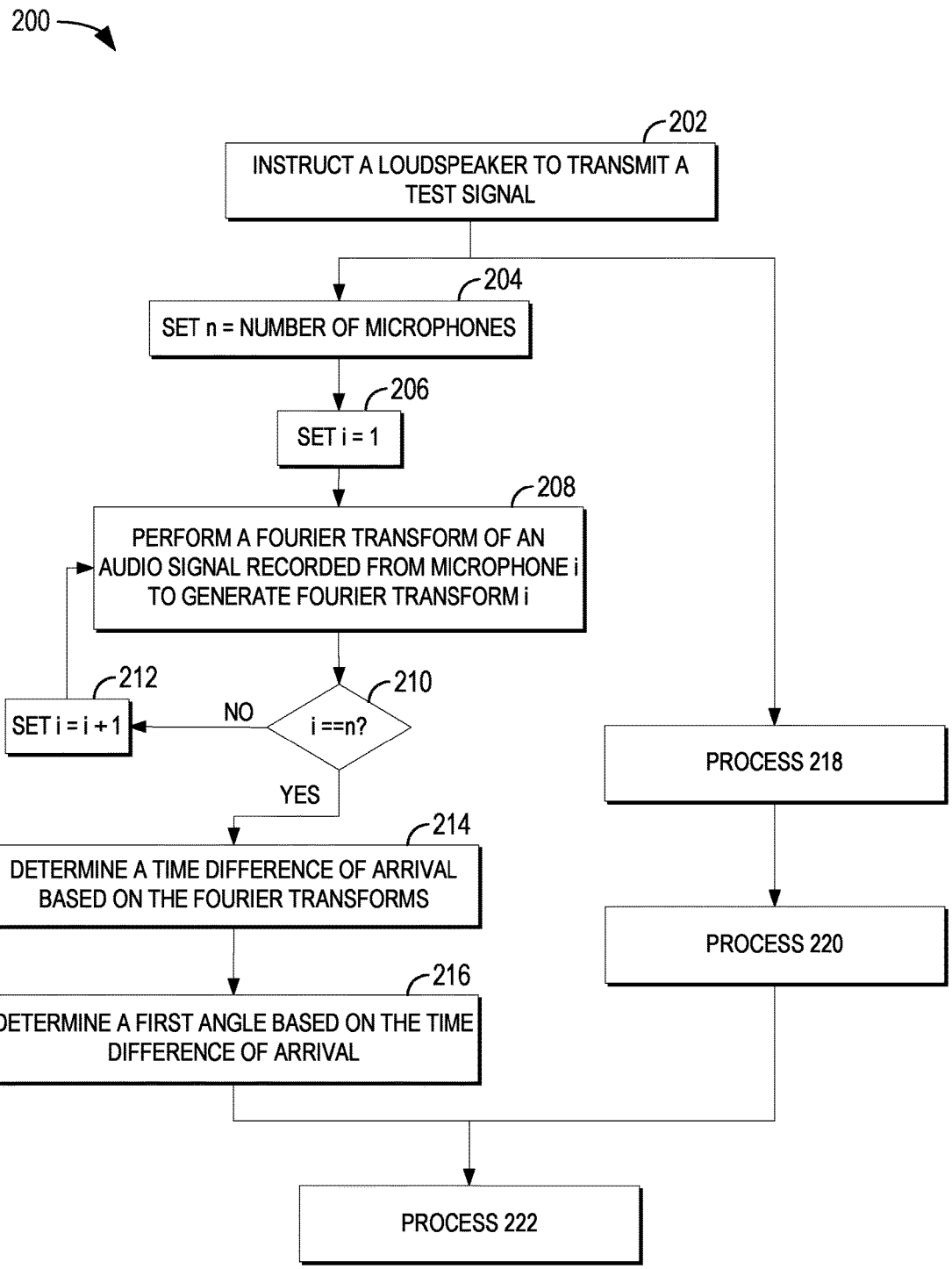
FIG. 2A illustrates an example loudspeaker position estimation process.

FIG. 2A illustrates an example loudspeaker position estimation process 200. In an embodiment, the process 200 can be performed by any of the systems described herein, including the soundbar 110 (e.g., the position estimation engine 116 and/or the notification generator 118) discussed above with respect to FIGS. 1A-1B. Depending on the embodiment, the process 200 may include fewer and/or additional blocks or the blocks may be performed in an order different than illustrated.

Blocks 204, 206, 208, 210, 212, 214, and 216 correspond to the first example technique for estimating a position of a loudspeaker. For example, the first technique may be the GCC-PHAT technique and may produce a first angle estimate. Furthermore, processes 218 and 220, which are described in FIGS. 2B and 2C, respectively, correspond to the second technique for estimating a position of a loudspeaker. For example, the second technique may be a DPC technique and may produce a second angle estimate.

The process 200 may begin at block 202 after a listener initiates a calibration and may be one of several processes implemented by the soundbar 110 to perform the calibration. The process 200 described herein can be implemented by the soundbar 110 (e.g., the position estimation engine 116 and/or the notification generator 118) to estimate a position of a single loudspeaker and/or to generate a notification regarding the estimated position. The soundbar 110 may repeat the process 200 for one or more loudspeakers in a multichannel surround sound system. For example, the soundbar 110 may perform the process 200 once for the left surround loudspeaker 106 and once for the right surround loudspeaker 108.

At block 202, a loudspeaker is instructed to transmit a test signal. For example, the test signal may be a maximum length sequence (e.g., a pseudorandom binary sequence). The loudspeaker may be instructed to transmit the test signal by the position estimation engine 116 via a wired or wireless connection. In an embodiment, the test signal is output for 500 ms. The loudspeaker may output the test signal after a delay, such as a loopback delay (e.g., delay caused by hardware components in the soundbar 110 and/or the loudspeaker, such as delay caused by hardware buffering, hardware filtering, converting signals from digital to analog, converting signals from analog to digital, and/or the like). The microphones in the microphone array 114 may each receive acoustic signals generated as a result of the outputted test signal. The microphones in the microphone array 114 may then further transduce the acoustic signals into electrical signals that respectively correspond to audio signals. The audio signals may be subsequently recorded in a storage device (not shown). For example, the audio signals may include the direct path component of the outputted test signal as well as reverberations caused by objects (e.g., walls, objects, etc.) in the room environment 100. After completing block 202, the process 200 continues to block 204 and the process 218.

At block 204, a variable n is set equal to the number of microphones in the microphone array 114. For example, the variable n can be set to 2, 3, 4, 5, 6, etc.

At block 206, a variable i is set equal to one. The variable i may identify a particular microphone in the microphone array 114.

At block 208, a Fourier transform of an audio signal recorded from microphone i is performed to generate Fourier transform i. Audio signals from microphone i may be recorded for a set amount of time. For example, the set amount of time may be based on a maximum distance of the loudspeaker from the soundbar 110 and a time length of the test signal. As an example, a maximum distance of the loudspeaker from the soundbar 110 may be expected to be between 15 m and 20 m. Thus, given that the speed of sound in air is approximately 342 m/s, the expected maximum amount of propagation time for the outputted test signal to reach microphone i from a loudspeaker may be between approximately 43.9 ms and 58.5 ms. Audio signals from microphone i may then be recorded for at least the expected maximum amount of propagation time plus the time length of the test signal (e.g., at least approximately 558.5 ms). The Fourier transform may be performed on the entire recorded audio signal (e.g., approximately 558.5 ms of the audio signal). Alternatively, the Fourier transform may be performed on a portion of the recorded audio signal (e.g., a 10 ms to 30 ms segment of the recorded audio signal) and/or multiple Fourier transforms may be performed on different portions of the recorded audio signal (e.g., a Fourier transform may be performed on each 30 ms segment of the recorded audio signal).

At block 210, the process 200 determines whether the variable i is equal to the variable n. If variables i and n are equal, then the process 200 has performed a Fourier transform on the audio signals recorded from each microphone in the microphone array 114 and can proceed to block 214. Otherwise, the process 200 has not performed a Fourier transform on the audio signals recorded from each microphone in the microphone array 114 and can proceed to block 212.

At block 212, the variable i is incremented by 1. After incrementing the variable i by 1, the process 200 reverts back to block 208.

At block 214, a time difference of arrival is determined based on the Fourier transforms. For example, the outputted test signal (e.g., in the form of an acoustic signal) may reach each microphone in the microphone array 114 at a different time given the different locations of the microphones in the microphone array 114. The time difference of arrival may represent this difference in time. In the case in which the microphone array 114 includes two microphones, the time difference of arrival can be determined as follows:

$$\bar{\tau} = \underset{\beta}{\operatorname{argmax}} \int_{-\infty}^{\infty} W(\omega) X_1(\omega) \overline{X_2(\omega)} e^{-j\omega\beta} d\omega \quad (1)$$

where $\bar{\tau}$ is the time difference of arrival between the two microphones, $X_1(\omega)$ and $X_2(\omega)$ are the Fourier transforms of the audio signals recorded from the two microphones, respectively, and $W(\omega)$ is a weighting function. The weighting function may be defined as follows:

$$W(\omega) = \frac{1}{|X_1(\omega)\overline{X_2(\omega)}|} \quad (2)$$

In alternate embodiments, the position estimation engine 116 determines a set of possible time difference of arrival estimates and selects one time difference of arrival estimate as being the time difference of arrival estimate to use in determining the first angle. For example, as described above, the Fourier transform can be performed on a portion of the recorded audio signal, such as a 10 ms to 30 ms segment of the recorded audio signal. Because the test signal may last a longer period of time (e.g., 500 ms), the recorded audio signal may have a similar time length and can be divided or partitioned into multiple equal or nearly equal segments. A time difference of arrival can then be determined for each segment. For example, a first time difference of arrival can be determined for a first segment recorded from a first microphone in the microphone array 114 and a first segment recorded from a second microphone in the microphone array 114, a second time difference of arrival can be determined for a second segment recorded from the first microphone in the microphone array 114 and a second segment recorded from the second microphone in the microphone array 114, and so on. The position estimation engine 116 can organize the various time difference of arrival estimates into a histogram. For example, the position estimation engine 116 can quantize the time difference of arrival estimates and then bin the quantized time difference of arrival estimates. The time difference of arrival estimate that has the highest number of occurrences (e.g., the bin that has the highest number of quantized time difference or arrival estimates) can be selected as the time difference of arrival estimate to use in determining the first angle. Optionally, each time difference of arrival estimate may be derived from an interpolated cross-correlation to achieve subsample accuracy. Each time difference of arrival estimate may include an integer portion and a fractional portion. The integer portion of the time difference of arrival estimates may be organized into a histogram. The integer portion of the time difference of arrival may then be selected based on the histogram (e.g., the integer portion corresponding to the time difference of arrival estimate that has the highest number of occurrences may be selected as the integer portion of the time difference of arrival) and a fractional portion corresponding with the selected time difference of arrival estimate can then be added back to the integer portion. As an example, the fractional portion corresponding with the selected time difference of arrival estimate can be derived by taking an average of the fractional portions of the original time difference of arrival estimates whose integer portions were in the selected bin.

Figure 8:
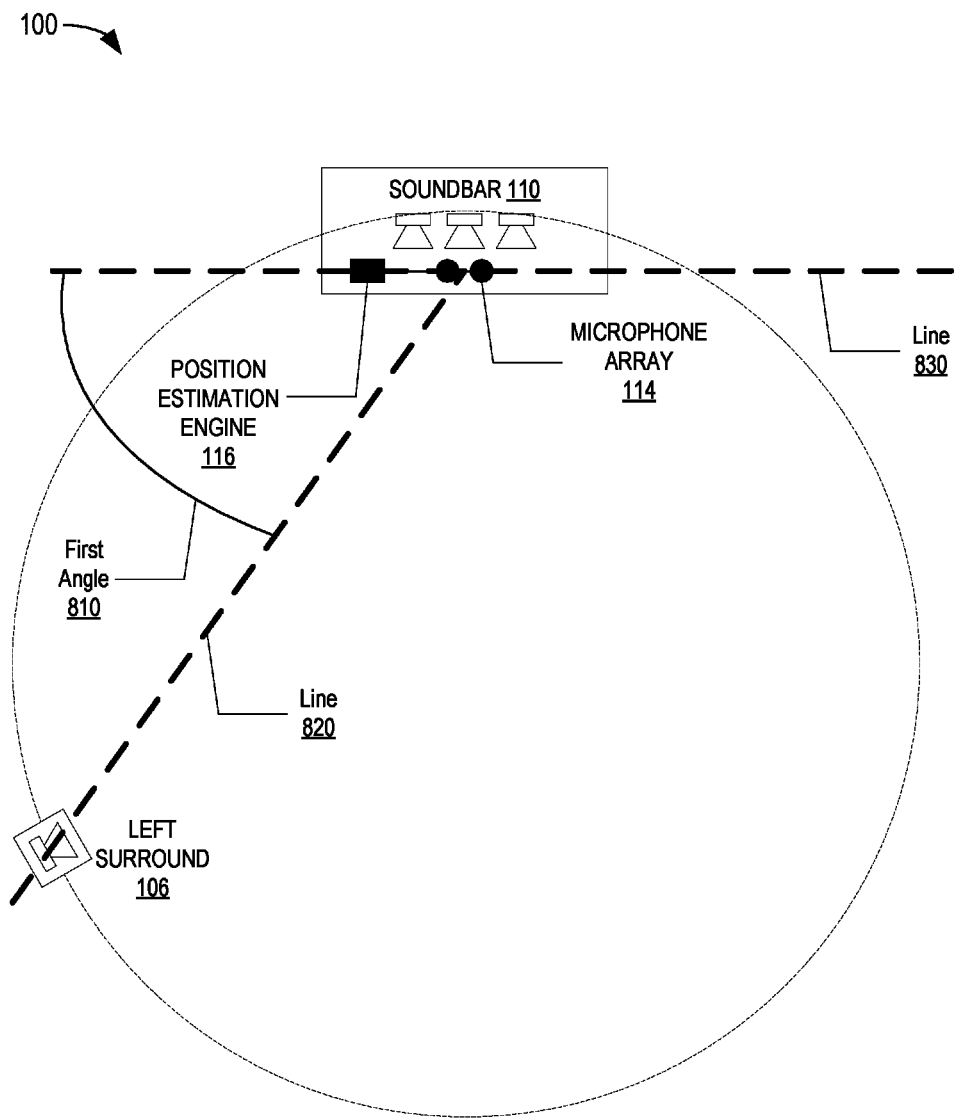
FIG. 8 illustrates a high-level block diagram depicting an example of a first angle in the example room environment of FIG. 1A, according to one embodiment.

At block 216, a first angle for the loudspeaker is determined based on the time difference of arrival. For example, the distance between microphones in the microphone array 114 may be known. The first angle can then be determined as follows:

$$\theta = \cos^{-1}\frac{\tau c}{d} \quad (3)$$

where c is the speed of sound in air, d is distance between microphones in the microphone array 114, and r is the time difference of arrival. The first angle may represent an angle of a line connecting the center of the loudspeaker to the center of the microphone array 114 with respect to a line that passes through the microphones in the microphone array 114. As an example, if the microphones in the microphone array 114 are aligned in a line that has no y-component in an x-y coordinate plane and the center of the loudspeaker is positioned such that a line connecting the center of the loudspeaker and the center of the microphone array 114 has no x-component in the x-y coordinate plane, then the determined first angle may be 90 degrees. FIG. 8 illustrates a high-level block diagram depicting an example of a first angle 810 in the example room environment 100 of FIG. 1A, according to one embodiment. As illustrated in FIG. 8, a line 820 connects the center of the left surround loudspeaker 106 to the center of the microphone array 114 and a line 830 represents a line that passes through the microphones in the microphone array 114. The first angle 810 represents an angle between the line 820 and the line 830. After the first angle is determined, the process 200 proceeds to process 222, which is described in greater detail with respect to FIG. 2D. In an embodiment, a first angle may be determined for a microphone array 114 including more than 2 microphones by (1) determining a first angle for each pair of microphones (e.g., repeat blocks 214 and 216 for each pair of microphones) and then fusing the results, and/or (2) by using a linear algebraic formulation to determine a direction of arrival.

Figure 2B:
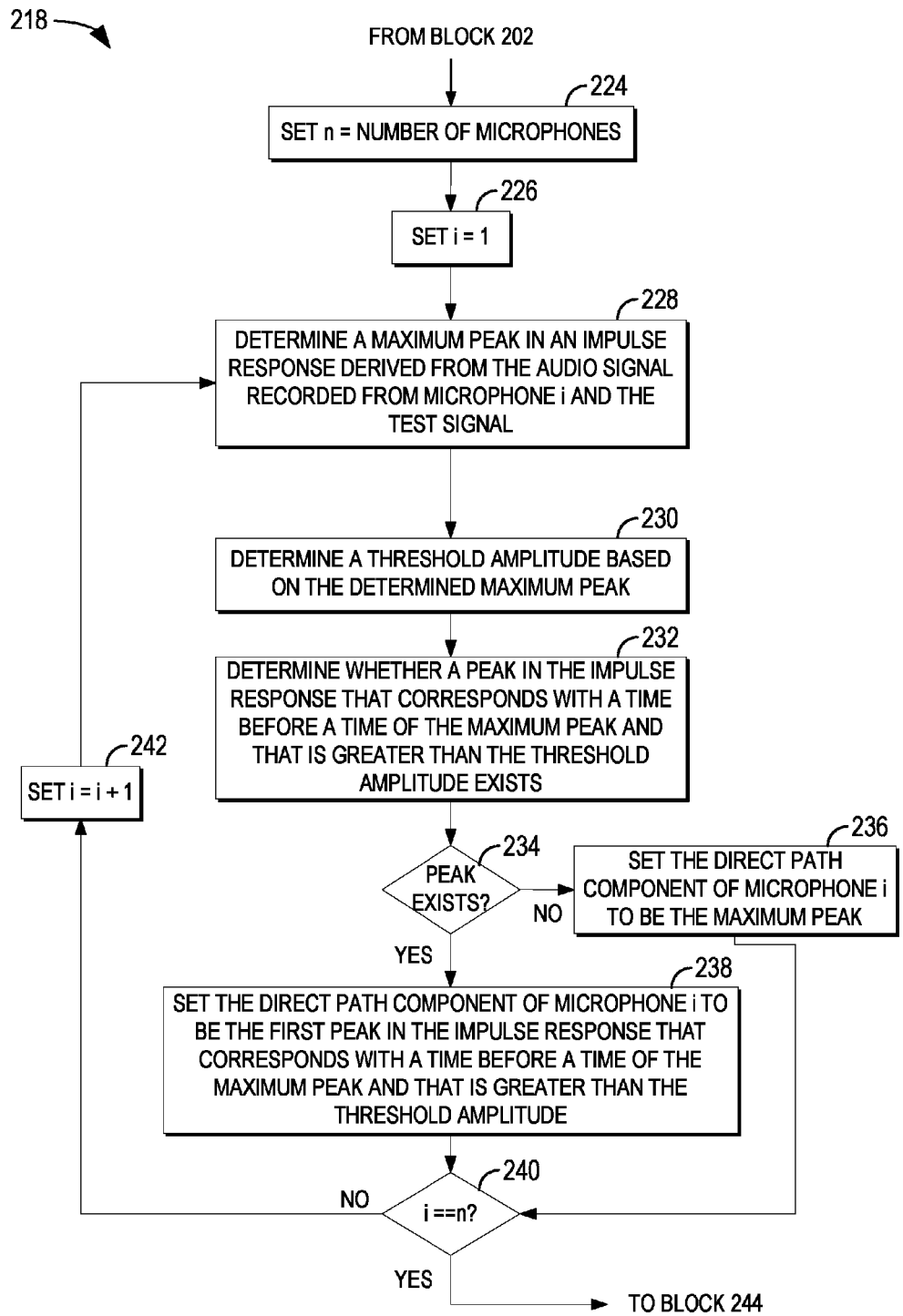
FIG. 2B illustrates an example direct path component (DPC) selection process.

FIG. 2B illustrates an example DPC selection process 218. In an embodiment, the process 218 can be performed by any of the systems described herein, including the soundbar 110 (e.g., the position estimation engine 116) discussed above with respect to FIGS. 1A-1B. Depending on the embodiment, the process 218 may include fewer and/or additional blocks or the blocks may be performed in an order different than illustrated.

The process 218 may begin at block 224 after the block 202 of the process 200 is completed. At block 224, a variable n is set equal to the number of microphones in the microphone array 114. For example, the variable n can be set to 2, 3, 4, 5, 6, etc.

At block 226, a variable i is set equal to one. The variable i may identify a particular microphone in the microphone array 114.

At block 228, a maximum peak in an impulse response derived from the audio signal recorded from microphone i and the test signal is determined. As an example, position estimation engine 116 can derive the impulse response by taking the Fourier transform of the recorded audio signal and dividing the result by the Fourier transform of the test signal. The division results in a Fourier transform of the transfer function. The position estimation engine 116 can then take an inverse Fourier transform of the Fourier transform of the transfer function to derive the impulse response. In an embodiment, the position estimation engine 116 identifies the maximum peak within a time window that starts at a time corresponding to one loopback delay after the loudspeaker is instructed to output the test signal and that ends at a time corresponding to an expected maximum amount of time to receive the test signal plus the time length of the test signal.

At block 230, a threshold amplitude is determined based on the determined maximum peak. For example, the threshold amplitude can be a set percentage (e.g., 50%, 60%, 70%, 80%, 90%, etc.) of the determined maximum peak.

At block 232, whether a peak in the impulse response that corresponds with a time before a time of the maximum peak and that is greater than the threshold amplitude exists is determined. In some cases, due to reverberations in the room environment 100, the maximum peak is not the DPC (e.g., an audio signal that travels in a direct path from the loudspeaker to microphone i as opposed to other audio signals that may reach microphone i after reflecting off one or more surfaces). Thus, the position estimation engine 116 may determine the DPC by finding another peak that occurs before the maximum peak and that has an amplitude above a certain threshold value.

At block 234, the process 218 continues to block 238 if a peak before the maximum peak exists that has an amplitude greater than the threshold amplitude. Otherwise, the process 218 continues to block 236.

Figure 3:
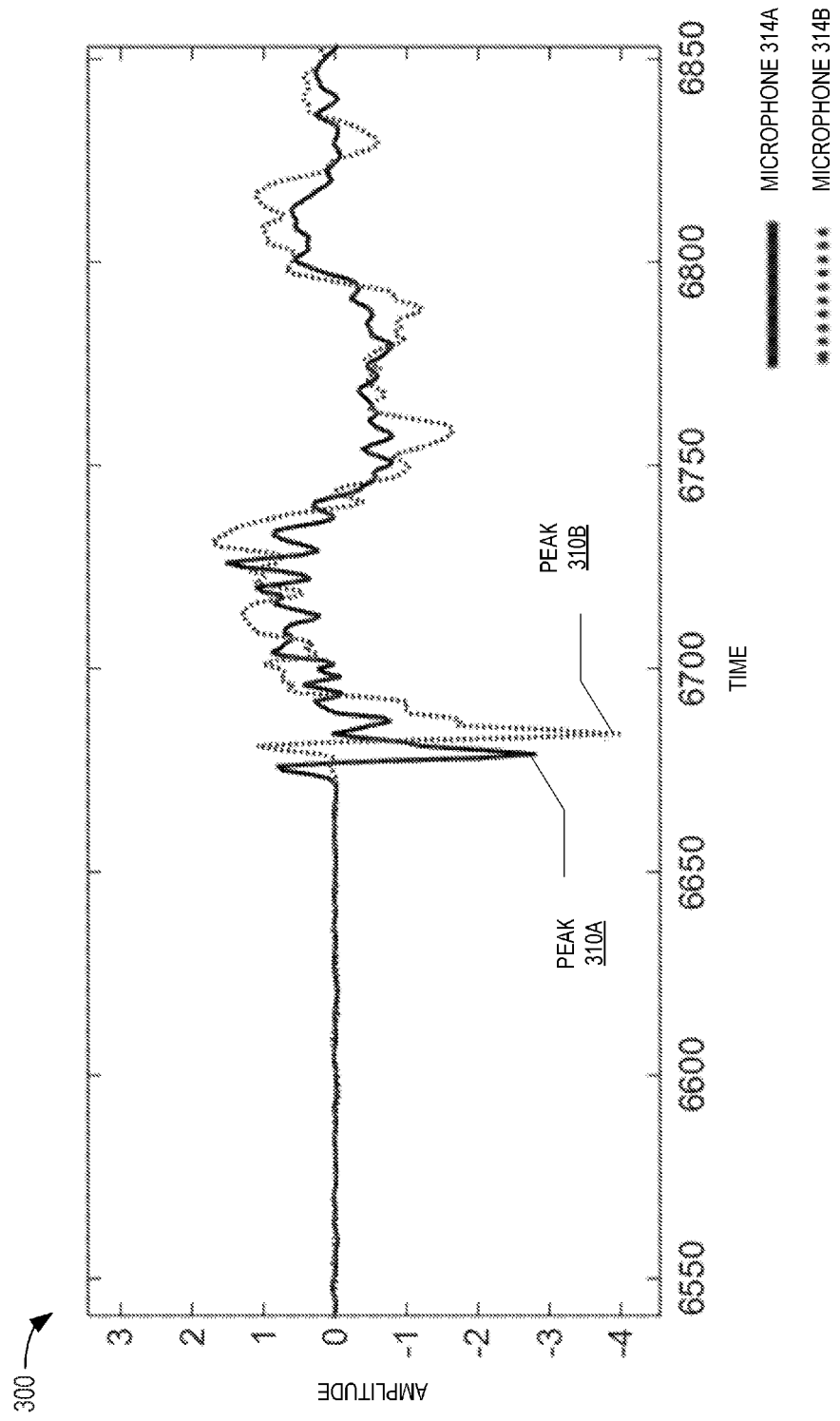
FIG. 3 illustrates an example graph depicting the impulse response for a first microphone in the microphone array of FIG. 1A and the impulse response for a second microphone in the microphone array of FIG. 1A.

At block 236, the DPC of microphone i is set to be the maximum peak. For example, the DPC may be set to the maximum peak because no other peak occurred before the maximum peak that had an amplitude high enough to be considered the DPC. FIG. 3 illustrates an example graph 300 depicting the impulse response for a microphone 314A in the microphone array 114 and the impulse response for a microphone 314B in the microphone array 114. As illustrated in FIG. 3, peak 310A is the maximum peak for the impulse response of microphone 314A and peak 310B is the maximum peak for the impulse response of microphone 314B. None of the peaks that occur before peaks 310A and 310B may exceed the threshold amplitude and thus peak 310A may be set as the DPC of the impulse response for microphone 314A and peak 310B may be set as the DPC of the impulse response for microphone 314B.

At block 238, the DPC of microphone i is set to be the first peak in the impulse response that corresponds with a time before a time of the maximum peak and that is greater than the threshold amplitude. For example, multiple peaks that occur before the maximum peak may exceed the threshold amplitude. However, the first peak that exceeds the threshold amplitude may be selected as the DPC.

At block 240, the process 218 determines whether the variable i is equal to the variable n. If variables i and n are equal, then the process 218 has determined the DPC for each microphone in the microphone array 114 and can proceed to block 244 of process 220. Otherwise, the process 218 has not determined the DPC for each microphone in the microphone array 114 and can proceed to block 242.

At block 242, the variable i is incremented by 1. After incrementing the variable i by 1, the process 218 reverts back to block 228.

Figure 2C:
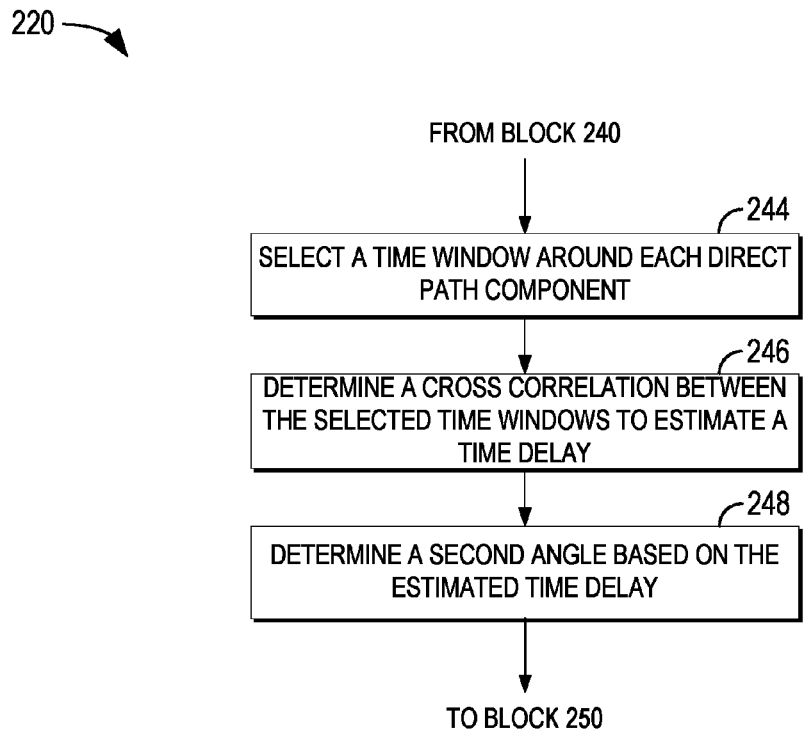
FIG. 2C illustrates an example loudspeaker angle determination process using DPCs.

FIG. 2C illustrates an example loudspeaker angle determination process 220 using DPCs. In an embodiment, the process 220 can be performed by any of the systems described herein, including the soundbar 110 (e.g., the position estimation engine 116) discussed above with respect to FIGS. 1A-1B. Depending on the embodiment, the process 220 may include fewer and/or additional blocks or the blocks may be performed in an order different than illustrated.

The process 220 may begin at block 244 after the block 240 of the process 218 is completed. At block 244, a time window around each DPC is selected. For example, the position estimation engine 116 can, for each microphone i DPC, select a time window around the respective DPC. The time window may start a few ms (e.g., 10 ms, 20 ms, etc.) before a time of the DPC peak and may end a few ms (e.g., 10 ms, 20 ms, etc.) after a time of the DPC peak.

At block 246, a cross correlation between the selected time windows is determined to estimate a time delay. For example, the position estimation engine 116 can determine a cross correlation of the data included in the selected time windows. The estimated time delay may correspond to a length of time between a start of the cross-correlated data (e.g., a time that corresponds to a start of the microphone i time window) and a time at which the cross-correlated data has the highest amplitude. Optionally, interpolation can be performed on the cross correlation output to further improve the accuracy of the time delay estimation. In alternate embodiments, the position estimation engine 116 can determine the estimated time delay by subtracting a time corresponding to the DPC peak for a first microphone from a time corresponding to the DPC peak for a second microphone. However, this approach may yield higher noise than performing the cross correlation because even an error of 1 sample may significantly impact the resulting angle determination in some embodiments.

At block 248, a second angle is determined based on the estimated time delay. For example, Equation (3) can be used along with the estimated time delay (e.g., replacing the time difference of arrival) to determine the second angle. The second angle may represent an angle of a line connecting the center of the loudspeaker to the center of the microphone array 114 with respect to a line that passes through the microphones in the microphone array 114. Once the process 220 determines the second angle, the process 220 can continue to block 250 of process 222.

Figure 2D:
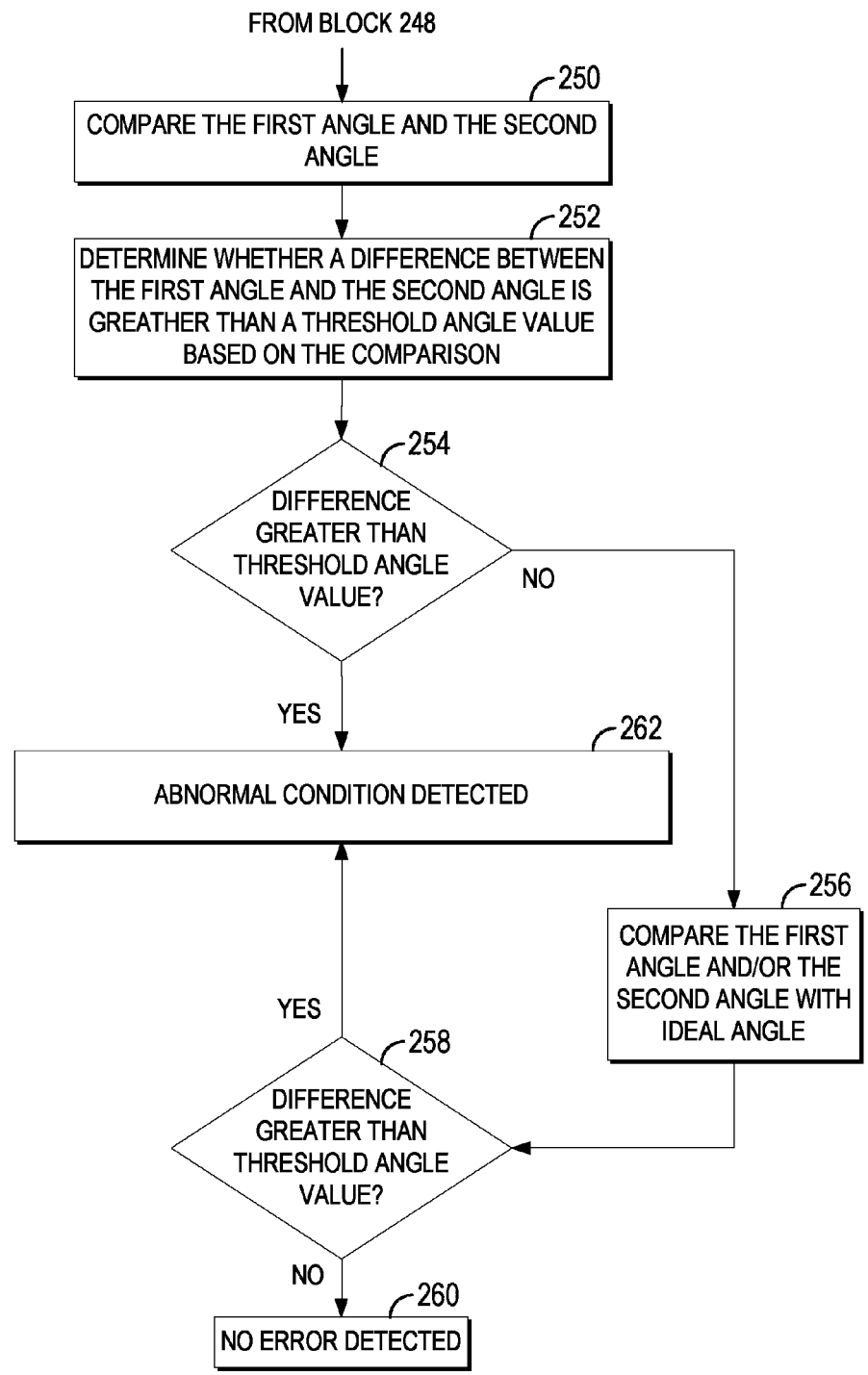
FIG. 2D illustrates an example loudspeaker abnormal condition detection process.

FIG. 2D illustrates an example loudspeaker abnormal condition detection process 222. In an embodiment, the process 222 can be performed by any of the systems described herein, including the soundbar 110 (e.g., the position estimation engine 116 and/or the notification generator 118) discussed above with respect to FIGS. 1A-1B. Depending on the embodiment, the process 222 may include fewer and/or additional blocks or the blocks may be performed in an order different than illustrated.

The process 222 may begin at block 250 after the block 248 of the process 220 is completed. At block 250, the first angle is compared with the second angle. In some embodiments, blocks 202, 204, 206, 208, 210, 212, 214, and 216, process 218, and process 220 are repeated several times. Thus, the first angle and the second angle can be compared over a series of tests.

The determined first angle may be accurate when an output of the loudspeaker is directly facing the microphone array 114. However, the determined first angle may not be accurate when an output of the loudspeaker is facing a direction other than a direction toward the microphone array 114 or when there is an obstruction in the path between the microphone array 114 and the loudspeaker. The determined second angle may also be accurate when an output of the loudspeaker is directly facing the microphone array 114 and may be more accurate than the determined first angle when the loudspeaker is facing a direction other than a direction toward the microphone array 114 or there is an obstruction in the path between the microphone array 114 and the loudspeaker.

Accordingly, at block 252, whether a difference between the first angle and the second angle is greater than a threshold angle value is determined based on the comparison. If the difference between the two angles exceeds the threshold angle value, this may indicate that an abnormal condition exists. As an example, the threshold angle value can be between 0 and 15 degrees. Given the relatively consistent accuracy of the DPC technique and the inaccuracy of the GCC-PHAT technique when the loudspeaker is not facing the microphone array 114 or an object obstructs a path between the loudspeaker and the microphone array 114, the position estimation engine 116 may provide the result obtained by the DPC method in such situations. However, even if the difference between the two angles does not exceed the threshold angle value, an incorrect or non-ideal angle of the loudspeaker and/or an incorrect or non-ideal loudspeaker location may still be present.

Figure 4:
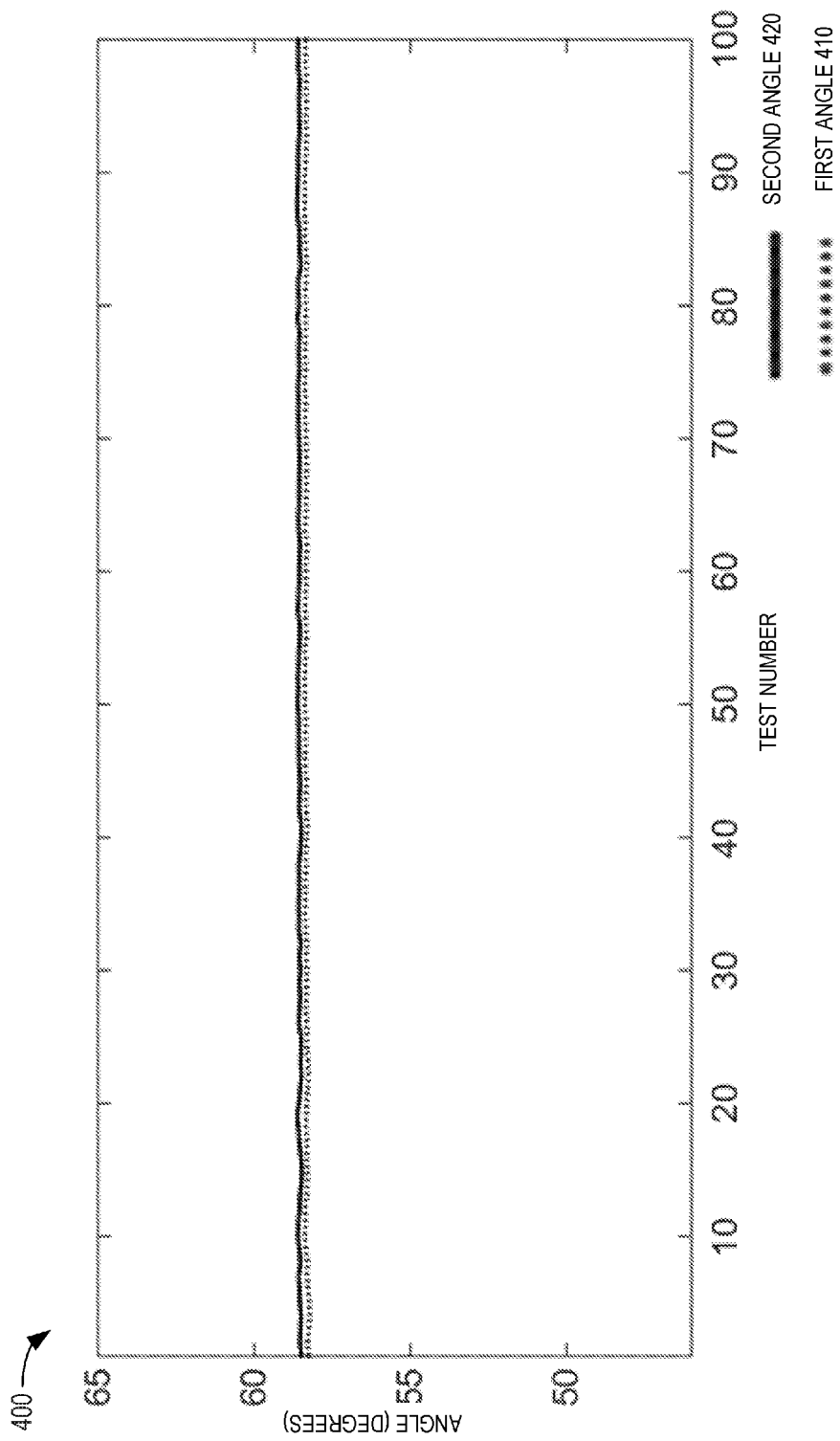
FIG. 4 illustrates an example graph depicting a situation in which a determined first angle and a determined second angle have similar values.
Figure 5:
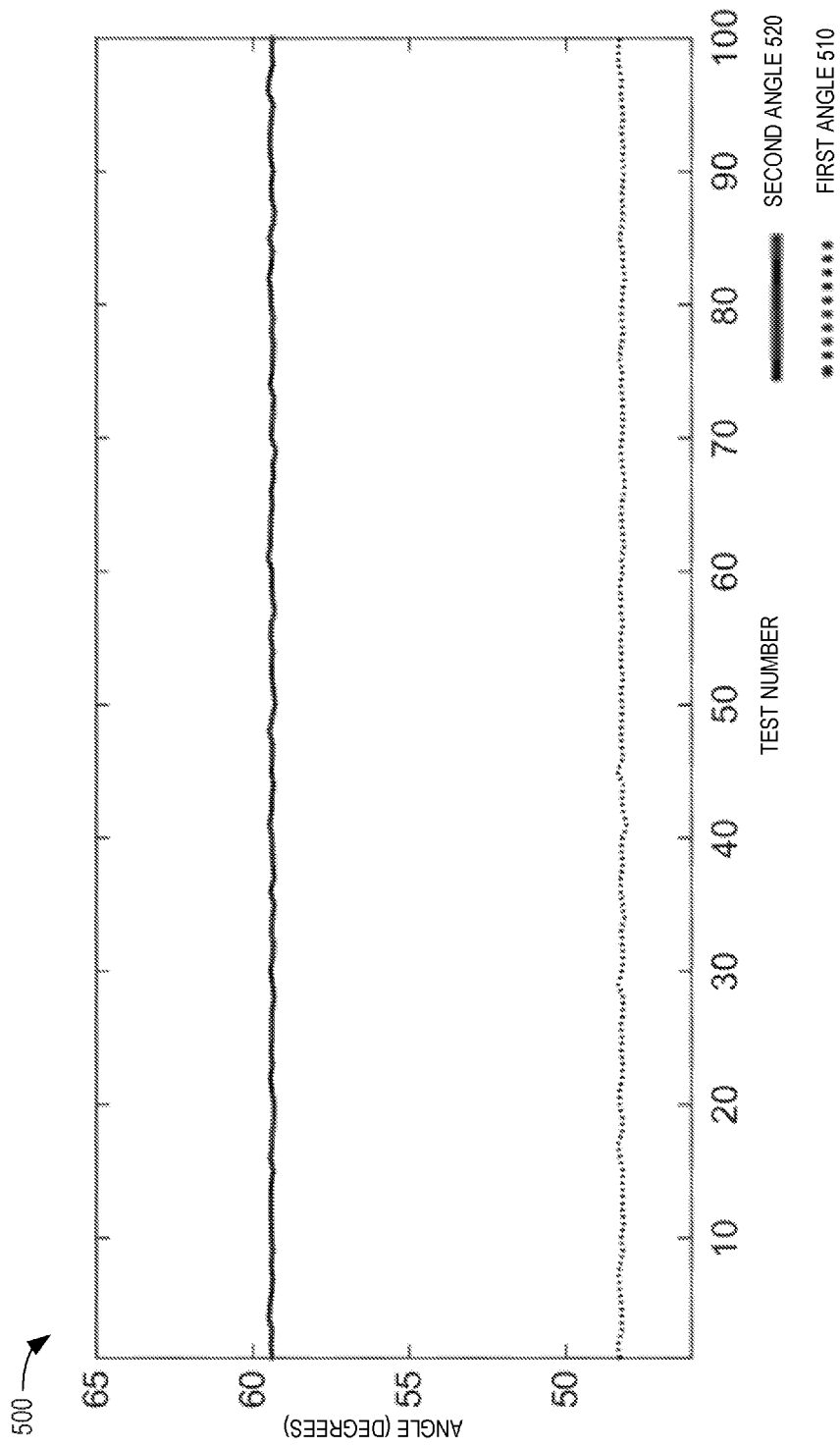
FIG. 5 illustrates an example graph depicting a situation in which a determined first angle and a determined second angle do not have similar values.

At block 254, the process 222 continues to block 256 if the two angles are within the threshold angle value. Otherwise, the process 222 continues to block 262. FIG. 4 illustrates an example graph 400 depicting a situation in which a determined first angle 410 (e.g., determined using the GCC-PHAT technique) and a determined second angle 420 (e.g., determined using the DPC technique) have similar values. For example, the values of the determined first angle 410 and the determined second angle 420 may be within the threshold angle value (e.g., the angles are approximately within 0.3 degrees). Multiple tests may be run such that multiple first and second angles 410 and 420 are determined. FIG. 5 illustrates an example graph 500 depicting a situation in which a determined first angle 510 (e.g., determined using the GCC-PHAT technique) and a determined second angle 450 (e.g., determined using the DPC technique) do not have similar values. For example, the values of the determined first angle 510 and the determined second angle 520 may not be within the threshold angle value (e.g., the angles are approximately 11 degrees apart). Multiple tests may be run such that multiple first and second angles 510 and 520 are determined.

At block 256, the first and/or second angle are compared with an ideal angle. The ideal angle may be an angle derived or provided from an ideal loudspeaker layout. The comparison may be performed to determine whether an incorrect or non-ideal angle of the loudspeaker and/or an incorrect or non-ideal loudspeaker location is present.

At block 258, the process 222 continues to block 260 if the first and/or second angle are within a threshold angle value (either the same threshold angle value as in blocks 252 and 254 or different) of the ideal angle (e.g., which indicates that no incorrect or non-ideal angle of the loudspeaker and/or incorrect or non-ideal loudspeaker location is detected). Otherwise, the process 222 continues to block 262.

At block 260, no error is detected. The position estimation engine 116 may indicate that no error is detected to the notification generator 118. The notification generator 118 may generate a notification indicating that no error is detected, that an angle of the loudspeaker is correct, and/or that no object is obstructing the path between the loudspeaker and the soundbar 110 (e.g., the microphone array 114). Alternatively, the notification generator 118 may not generate a notification. The soundbar 110 may use either determined angle and/or a distance determined based on the DPC peak to perform the remaining portion of the calibration.

At block 262, an abnormal condition is detected. The position estimation engine 116 may indicate to the notification generator 118 that an abnormal condition is detected. The notification generator 118 may generate a notification indicating that an object is obstructing a path between the microphone array 114 and the loudspeaker and/or that the object should be removed, that an incorrect or non-ideal angle of the loudspeaker is detected, that an incorrect or non-ideal loudspeaker location is detected, and/or that an incorrect polarity is detected.

Alternatively or in addition, the notification may indicate that the loudspeaker is incorrectly oriented. For example, the notification may notify the listener 120 to check the loudspeaker's orientation (e.g., check whether the loudspeaker is oriented toward the center of the circle 130).

Alternatively or in addition, the notification may indicate that the loudspeaker has an incorrect location (e.g., the loudspeaker is placed on the wrong side of the room given the output that the loudspeaker is wired to). For example, when the calibration is initiated, the soundbar 110 instructs one or more of the loudspeakers to output a test signal. The soundbar 110 therefore knows which surround loudspeaker, for example, is outputting a test signal at a given time. If the listener 120 wired the left surround and right surround loudspeakers such that the left surround loudspeaker 106 is connected to the right surround jack and the right surround loudspeaker 108 is connected to the left surround jack, the soundbar 110 may instruct the left surround loudspeaker 106 to output the test signal when it is expected that the right surround loudspeaker 108 is outputting a test signal. The determined second angle (and/or the determined first angle) may have a value that would be expected if a left surround loudspeaker 106 and not a right surround loudspeaker 108 was outputting a test signal. Thus, the value of the determined second angle (and/or the determined first angle) being similar to a value expected for a loudspeaker of an alternate designation (e.g., the value of the determined second angle for a left surround loudspeaker being similar to a value expected for a right surround loudspeaker) can be recognized by the position estimation engine 116 and the listener 120 can be notified appropriately. In additional embodiments, the soundbar 110 can reroute the internal wiring of the soundbar 110 in such a situation so that the listener 120 does not have to manually swap the loudspeakers.

Alternatively or in addition, the notification may indicate that the loudspeaker has an incorrect polarity. For example, a user may have connected a positive input of a loudspeaker to a negative jack and may have connected a negative input of the loudspeaker to a positive jack. In such a situation, the audio signal recorded from the microphones in the microphone array 114 may be out of phase (e.g., 180 degrees out of phase) of a test signal. Thus, the position estimation engine 116 can compare the recorded audio signal and the test signal. If the two signals are out of phase with each other within a threshold of a certain value (e.g., 180 degrees), an incorrect polarity can be recognized by the position estimation engine 116 and the listener 120 can be notified appropriately. In additional embodiments, the soundbar 110 can reroute the internal wiring of the soundbar 110 to reverse the polarity in such a situation so that the listener 120 does not have to manually re-wire the loudspeaker.

Alternatively or in addition, the notification may indicate that the loudspeaker location is incorrect or non-ideal and/or to what location the loudspeaker should be repositioned. For example, the DPC peak may correspond to a distance between the loudspeaker and the microphone array 114. Because the DPC peak corresponds to the direct path of an audio signal from the loudspeaker to the microphone array 114, adding the loopback delay to the time that the loudspeaker is instructed to output the test signal and subtracting the combined time from the time that the DPC peak occurs corresponds to a time that an audio signal traveled from the loudspeaker to the microphone array 114. This time can be converted into a distance estimate by the position estimation engine 116 by multiplying the time by the speed of sound in air. The distance estimate may then represent the distance between the loudspeaker and the microphone array 114. The distance estimate may be combined with an angle estimate (e.g., the first angle) to determine a possible position of the loudspeaker. The position estimation engine 116 can derive compensation parameters for use by a compensation component to modify audio signals for optimal playback based on the determined possible position and/or the determined possible position can be displayed on a graphical user interface on the user device 140. The position estimation engine 116 may also determine a position along the recommended arrangement circle 130 that is close to the possible position (e.g., the closest position in a standard layout) as a suggested location for repositioning the loudspeaker. In some embodiments, the calibration may be run again after repositioning the loudspeaker to a recommended location. In some embodiments, one or more possible positions of the loudspeaker are displayed on the graphical user interface on the user device 140 and the listener 120 can select the position that best matches the physical location of the loudspeaker (e.g., such that the listener 120 is not requested to reposition the loudspeaker).

The notification generated at block 260 or 262 can be transmitted by the notification generator 118 to the user device 140 via the network 115. The user device 140 may then display the notification.

In alternate embodiments, if the difference between the determined angles exceeds the threshold angle value, then the position estimation engine 116 selects the determined second angle and/or a distance determined based on the DPC peak for use in performing the calibration. Thus, a notification may not be generated and the calibration may be completed.

Example Graphical User Interface

Figure 6:
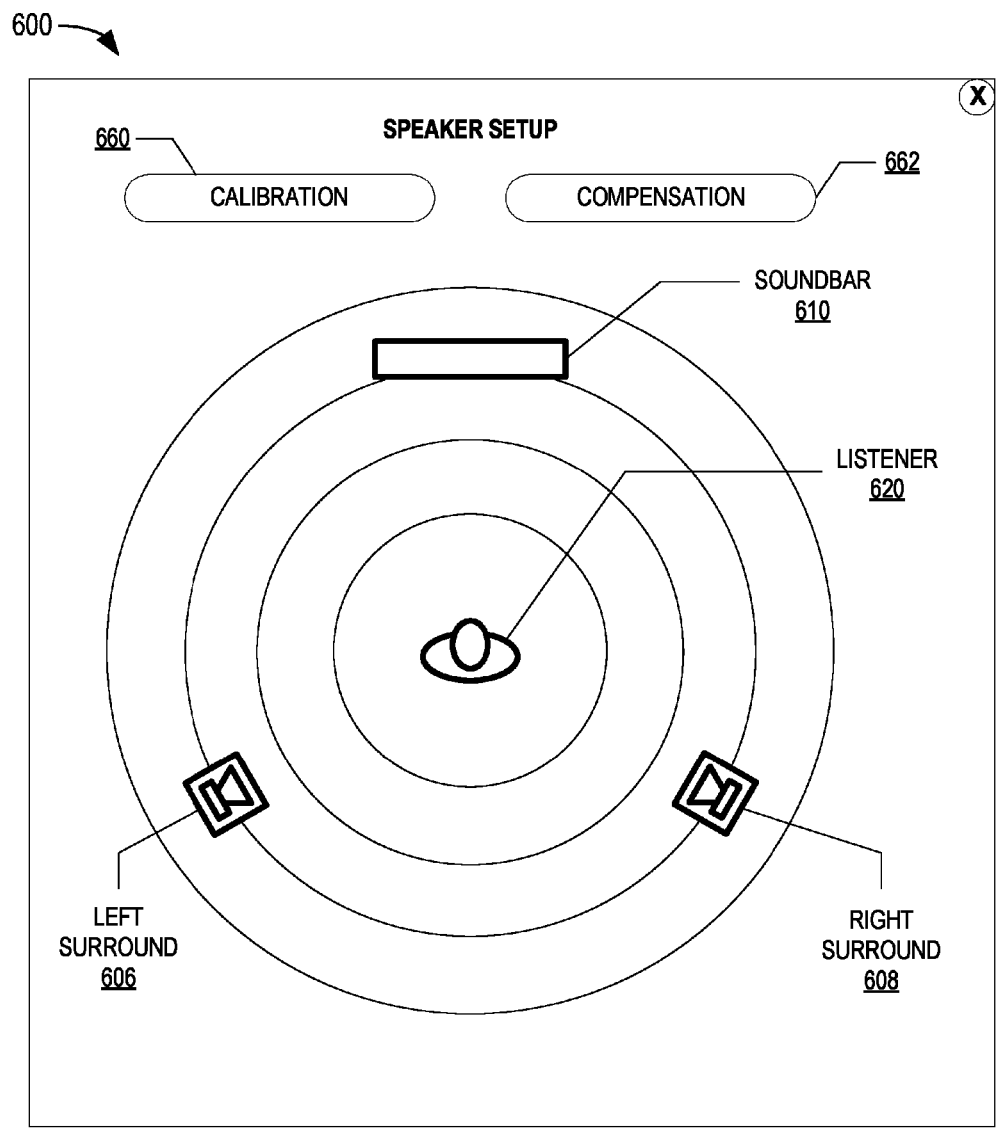
FIG. 6 illustrates an example graphical user interface (GUI) that may be displayed by the user device of FIG. 1B.

FIG. 6 illustrates an example graphical user interface (GUI) 600 that may be displayed by the user device 140 of FIG. 1B. For example, the user device 140 may execute an application that causes the user device 140 to display the GUI 600. The GUI 600 may include a calibration button 660, a compensation button 662, and a graphical representation of soundbar 610, listener 620, left surround loudspeaker 606, and right surround loudspeaker 608.

Selection of the calibration button 660 may cause the user device 140 to instruct the soundbar 610 (e.g., the physical device and not the representation depicted in the GUI 600) to perform a spatial and/or non-spatial (e.g., an incorrect polarity detection) calibration. As part of the calibration, the soundbar 610 may generate a notification as described herein. If a notification is generated, the notification may be transmitted to the user device 140 and displayed in the GUI 600. Alternatively, the soundbar 610 can transmit the results of the calibration to the user device 140, and the user device 140 can determine whether a notification should be generated.

Selection of the compensation button 662 may toggle compensation processing on and off. In addition, the listener 620 icon can be selected and dragged within the GUI to represent the true position of the listener 620. Within the GUI 600, additional options may be selected (not shown) that allow a listener 620 to change the loudspeaker 606 and 608 layout, the listener 620 position, the loudspeaker 606 and 608 position, and/or the like. For example, these additional options (e.g., manual calibration options, such as allowing the listener 620 to select the location of a loudspeaker in the GUI 600 from several possible displayed options) may be presented to the listener 620 if abnormal conditions continue to be detected after notifications are provided to the listener 620 and/or the calibration is initiated one or more times.

Another Example Loudspeaker Position Estimation Process

Figure 7:
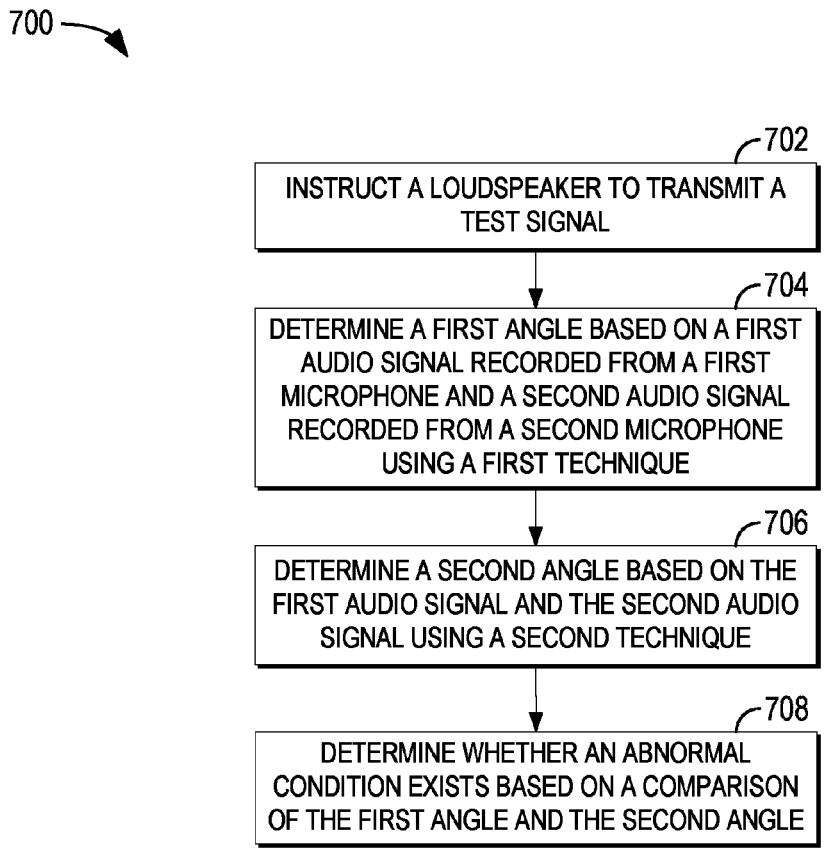
FIG. 7 illustrates another example loudspeaker position estimation process.

FIG. 7 illustrates another example loudspeaker position estimation process 700. In an embodiment, the process 700 can be performed by any of the systems described herein, including the soundbar 110 (e.g., the position estimation engine 116 and/or the notification generator 118) discussed above with respect to FIGS. 1A-1B. Depending on the embodiment, the process 700 may include fewer and/or additional blocks or the blocks may be performed in an order different than illustrated.

At block 702, a loudspeaker is instructed to transmit a test signal. For example, the test signal may be a maximum length sequence. The loudspeaker may be instructed to transmit the test signal by the position estimation engine 116 via a wired or wireless connection. The microphones in the microphone array 114 may each generate audio signals as a result of the outputted test signal. The audio signals may be recorded on a storage device (not shown).

At block 704, a first angle is determined based on a first audio signal recorded from a first microphone in the microphone array 114 and a second audio signal recorded from a second microphone in the microphone array 114 using a first technique. The first technique can be any technique used to estimate a position of a loudspeaker. For example, the first technique can be the GCC-PHAT technique described herein.

At block 706, a second angle is determined based on the first audio signal and the second audio signal using a second technique. The second technique can be any technique used to estimate a position of a loudspeaker other than the first technique. For example, the second technique can be the DPC technique described herein.

As illustrated in FIG. 7, blocks 704 and 706 are performed in sequence, with block 704 performed first. However, this is not meant to be limiting. For example, blocks 704 and 706 can be performed sequentially, with block 706 performed first. As another example, blocks 704 and 706 can be performed simultaneously.

At block 708, whether an abnormal condition exists is determined based on a comparison of the first angle and the second angle. For example, if the first angle and the second angle differ by more than a threshold angle value, then an abnormal condition, such as one or more of the abnormal conditions described herein, may exist. Otherwise, no abnormal condition may exist.

Additional Embodiments

One aspect of the disclosure provides an apparatus for estimating a position of a loudspeaker in a multichannel surround sound system. The apparatus comprises a microphone array comprising a first microphone and a second microphone, wherein the first microphone is configured to generate a first audio signal in response to the loudspeaker outputting a test signal, and wherein the second microphone is configured to generate a second audio signal in response to the loudspeaker outputting the test signal. The apparatus further comprises a position estimation engine coupled to the microphone array, the position estimation engine configured to: determine a time difference of arrival based on the first audio signal and the second audio signal; determine a first angle based on the time difference of arrival; identify a first direct path component in an impulse response derived from the first audio signal; identify a second direct path component in an impulse response derived from the second audio signal; determine a second angle based on the first direct path component and the second direct path component; and determine whether an abnormal condition exists based on a comparison of the first angle and the second angle.

The apparatus of the preceding paragraph can have any sub-combination of the following features: where the position estimation engine is further configured to: generate a Fourier transform of the first audio signal to form a first Fourier transform, generate a Fourier transform of the second audio signal to form a second Fourier transform, and determine the time difference of arrival based on the first Fourier transform and the second Fourier transform; where the position estimation engine is further configured to: determine other time difference of arrivals based on different portions of the first audio signal and different portions of the second audio signal, aggregate the time difference of arrivals and the other time difference of arrivals, and select the time difference of arrival for determining the first angle based on a number of occurrences of a value corresponding to the time difference of arrival in the aggregated time difference of arrivals; where the position estimation engine is further configured to identify the first direct path component in the impulse response derived from the first audio signal based on a highest amplitude in the impulse response derived from the first audio signal; where the position estimation engine is further configured to identify the first direct path component in the impulse response derived from the first audio signal based on a first amplitude in the impulse response derived from the first audio signal that occurs before a highest amplitude in the impulse response derived from the first audio signal and that is within a threshold value of the highest amplitude; where the position estimation engine is further configured to: select a first time window that includes the first direct path component, select a second time window that includes the second direct path component, determine a cross correlation using data in the first time window and data in the second time window, and determine the second angle using the determined cross correlation; where the position estimation engine is further configured to: compare the first angle with the second angle, and determine that the abnormal condition exists in response to a determination that the first angle and the second angle are not within a threshold angle value; where the position estimation engine is further configured to determine that the abnormal condition does not exist in response to a determination that the first angle and the second angle are within the threshold angle value; where the threshold angle value comprises between zero and fifteen degrees; where the apparatus further comprises a notification generator configured to transmit a notification to a user device via a network in response to a determination that the abnormal condition exists; where the notification comprises one of an indication that an angle of the loudspeaker is incorrect, an indication that an object is obstructing a path between the loudspeaker and the microphone array, an indication that a polarity of the loudspeaker is incorrect, or an indication that a position of the loudspeaker is incorrect or non-ideal; where the position estimation engine is further configured to instruct the loudspeaker to output the test signal; where the apparatus comprises one of a soundbar, an audio/visual (A/V) receiver, a center speaker, or a television; and where the multichannel surround sound system is arranged in one of a stereo, a 2.1, a 3.1, a 5.1, a 5.2, a 7.1, a 7.2, an 11.1, an 11.2, or a 22.2 speaker layout.

Terminology

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a hardware processor comprising digital logic circuitry, a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a device controller, or a computational engine within an appliance, to name a few.

The steps of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Disjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. An apparatus for estimating a position of a loudspeaker in a multichannel surround sound system, the apparatus comprising:
   a microphone array comprising a first microphone and a second microphone, wherein the first microphone is configured to generate a first audio signal in response to the loudspeaker outputting a test signal, and wherein the second microphone is configured to generate a second audio signal in response to the loudspeaker outputting the test signal; and
   a position estimation engine coupled to the microphone array, the position estimation engine configured to:
      determine a time difference of arrival estimate based on the first audio signal and the second audio signal;
      determine a first angle based on the time difference of arrival estimate;
      identify a first direct path component in an impulse response derived from the first audio signal;
      identify a second direct path component in an impulse response derived from the second audio signal;
      determine a second angle based on the first direct path component and the second direct path component;
      determine that an abnormal condition exists based on a comparison of the first angle and the second angle; and
      cause modification of signals sent to the loudspeaker for output to compensate for the abnormal condition.

2. The apparatus of claim 1, wherein the position estimation engine is further configured to:
   partition the first audio signal into one or more first segments;
   partition the second audio signal into one or more second segments;

generate a Fourier transform of a first segment in the one or more first segments to form a first Fourier transform;

generate a Fourier transform of a first segment in the one or more second segments to form a second Fourier transform; and determine the time difference of arrival estimate based on the first Fourier transform and the second Fourier transform.

3. The apparatus of claim 2, wherein the position estimation engine is further configured to:

determine a plurality of time difference of arrival estimates based on generated Fourier transforms of the one or more first segments and the one or more second segments;

aggregate the plurality of time difference of arrival estimates into a histogram; and determine the time difference of arrival estimate based on a time difference of arrival estimate in the plurality of time difference of arrival estimates that has the most occurrences in the histogram.

4. The apparatus of claim 1, wherein the position estimation engine is further configured to identify the first direct path component in the impulse response derived from the first audio signal based on a highest amplitude in the impulse response derived from the first audio signal.

5. The apparatus of claim 1, wherein the position estimation engine is further configured to:

select a first time window that includes the first direct path component;

select a second time window that includes the second direct path component;

determine a cross correlation using data in the first time window and data in the second time window; and determine the second angle using the determined cross correlation.

6. The apparatus of claim 1, wherein the position estimation engine is further configured to:

compare the first angle with the second angle; and determine that the abnormal condition exists in response to a determination that the first angle and the second angle are not within a threshold angle value.

7. The apparatus of claim 6, wherein the threshold angle value comprises a value between zero and fifteen degrees.

8. The apparatus of claim 1, further comprising a notification generator configured to transmit a notification to a user device via a network in response to the determination that the abnormal condition exists.

9. The apparatus of claim 8, wherein the notification comprises one of an indication that an angle of the loudspeaker is incorrect, an indication that an object is obstructing a path between the loudspeaker and the microphone array, an indication that a polarity of the loudspeaker is incorrect, or an indication that a position of the loudspeaker is incorrect.

10. The apparatus of claim 1, wherein the apparatus comprises one of a soundbar, an audio/visual (A/V) receiver, a center speaker, or a television.

11. The apparatus of claim 1, wherein the multichannel surround sound system is arranged in one of a stereo, a 2.1, a 3.1, a 5.1, a 5.2, a 7.1, a 7.2, an 11.1, an 11.2, or a 22.2 speaker layout.

12. A method of estimating a position of a loudspeaker in a multichannel surround sound system, the method comprising:

receiving a first audio signal from a first microphone in a microphone array and a second audio signal from a second microphone in the microphone array;

determining a time difference of arrival estimate based on the first audio signal and the second audio signal;

determining a first angle based on the time difference of arrival estimate;

identifying a first direct path component in an impulse response derived from the first audio signal;

identifying a second direct path component in an impulse response derived from the second audio signal;

determining a second angle based on the first direct path component and the second direct path component;

determining that an abnormal condition exists based on a comparison of the first angle and the second angle; and causing modification of signals sent to the loudspeaker for output to compensate for the abnormal condition.

13. The method of claim 12, wherein determining a time difference of arrival estimate further comprises:

partitioning the first audio signal into one or more first segments;

partitioning the second audio signal into one or more second segments;

generating a Fourier transform of a first segment in the one or more first segments to form a first Fourier transform;

generating a Fourier transform of a first segment in the one or more second segments to form a second Fourier transform; and determining the time difference of arrival estimate based on the first Fourier transform and the second Fourier transform.

14. The method of claim 12, wherein identifying a first direct path component in an impulse response derived from the first audio signal further comprises identifying the first direct path component in the impulse response derived from the first audio signal based on a highest amplitude in the impulse response derived from the first audio signal.

15. The method of claim 12, wherein determining that an abnormal condition exists further comprises:

comparing the first angle with the second angle; and determining that the abnormal condition exists in response to a determination that the first angle and the second angle are not within a threshold angle value.

16. The method of claim 15, wherein the threshold angle value comprises a value between zero and fifteen degrees.

17. The method of claim 12, further comprising transmitting a notification to a user device via a network in response to the determination that the abnormal condition exists, wherein the notification comprises one of an indication that an angle of the loudspeaker is incorrect, an indication that an object is obstructing a path between the loudspeaker and the microphone array, an indication that a polarity of the loudspeaker is incorrect, or an indication that a position of the loudspeaker is incorrect.

18. Non-transitory physical computer storage comprising executable instructions stored thereon that, when executed by a hardware processor, are configured to at least:

instruct a loudspeaker to transmit a test signal;

determine a first angle based on a first audio signal recorded from a first microphone in a microphone array and a second audio signal recorded from a second microphone in the microphone array using a first technique;

determine a second angle based on the first audio signal and the second audio signal using a second technique;

determine that an abnormal condition exists based on a comparison of the first angle and the second angle; and cause modification of signals sent to the loudspeaker for output to compensate for the abnormal condition.

19. The non-transitory physical computer storage of claim 18, wherein the first technique comprises a Generalized Cross Correlation And Phase Transform (GCC-PHAT) technique.

20. The non-transitory physical computer storage of claim 18, wherein the second technique comprises a direct path component (DPC) technique.

21. The apparatus of claim 1, wherein the position estimation engine is further configured to:
  estimate a location of the loudspeaker using at least one of the first angle or the second angle;
  estimate compensation parameters using the estimated location; and
  cause the modification of the signals sent to the loudspeaker for output using the estimated compensation parameters.

* * * * *